United States Patent Office 2,897,209
Patented July 28, 1959

2,897,209

SYNTHESIS OF GLUTAMIC ACID

Rudolph Kodras, Skokie, Ill., assignor to International Minerals & Chemical Corporation, a corporation of New York No Drawing. Application April 29, 1957
Serial No. 655,494

9 Claims. (Cl. 260—326.3)

The present invention relates to the preparation of glutamic acid. More particularly, it relates to the synthesis of pyrrolidonecarboxylic acid and DL-glutamic acid from acrolein dimer.

Glutamic acid is now obtained commercially from sugar beet waste liquors and from protein hydrolysates. These sources are limited either as to quantity or as to economic feasibility, or both, and numerous efforts have been made to prepare glutamic acid by synthetic methods.

The present invention is a new and improved synthetic method for preparing glutamic acid. Specifically, I have found that acrolein dimer, which has the following structural formula

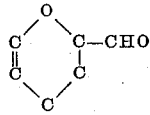

2-formyl-2,3-dihydro-1,4-pyran can be converted into DL-glutamic acid by subjecting the acrolein dimer to ozonization, cleaving the ozonization product under oxidizing conditions, reacting the resulting material with ammonia to produce ammonium pyrrolidonecarboxylate, hydrolyzing the latter, and recovering DL-glutamic acid therefrom.

An object of the present invention is to prepare glutamic acid by synthetic means.

Another object is to convert acrolein dimer into pyrrolidonecarboxylic acid and into glutamic acid.

Another object is to prepare an ozonization product which can be converted into DL-glutamic acid by oxidative cleavage, ammoniation, and hydrolysis.

Other objects of the invention and its advantages over the prior art will be apparent from the following description and claims.

Acrolein dimer is readily prepared by heating dry acrolein with hydroquinone in benzene, as described, for example, by Alder and Rueden, Ber., 74B (1941), 920–6.

The ozonization of acrolein dimer is conveniently carried out by dissolving the acrolein dimer in a suitable solvent and passing an ozone-containing gas through the solution. Any solvent for acrolein dimer can be used which does not undergo reaction during the ozone treatment, and which does not adversely affect the course of the ozonization reaction. Suitable solvents include halogenated hydrocarbons, such as methylene chloride, chloroform, carbon tetrachloride, and the like; lower aliphatic fatty acids, such as formic acid, acetic acid, propionic acid, and the like; alcohols, such as methanol, ethanol, isopropyl alcohol, n-butyl alcohol, and the like; esters of such acids and alcohols, e.g. ethyl acetate, propyl acetate, ethyl propionate, and the like; naphthenic hydrocarbons such as cyclohexane, methylcyclohexane, and the like; and other liquids readily ascertainable from the art. The concentration of acrolein dimer in the solvent may vary widely, and can conveniently range from about 5 to 50% by weight, based on the total solution, preferably between about 10 and about 25%.

The ozonization is conveniently carried out by passing through the solution of acrolein dimer a dry mixture of ozone and a diluent gas unaffected by the ozonization reaction, suitably air, oxygen, or an inert gas such as nitrogen. The concentration of ozone in the gaseous mixture is not critical, but the use of pure ozone or high concentrations of ozone may result in a waste of this material if the equipment or rate of flow does not permit adequate contact between the ozone and the acrolein dimer. I ordinarily prefer to employ a stream of oxygen containing between 2 and about 15% by weight of ozone. Lower concentrations of ozone are undesirable, because such concentrations unduly extend the reaction time.

Th ozonization is most conveniently carried out at ordinary temperatures, i.e., around 15 to 40° C., but higher temperatures and much lower temperatures can also be employed, suitably from as high as about 75° C. to as low as about −75° C.

The rate of addition of ozone to the reaction mixture is likewise not critical, and can be carried out at any convenient and reasonable rate under the existing conditions. At more rapid rates, the likelihood of losing ozone from the system because of incomplete reaction is greater, while at slow rates, the time required for complete ozonization is extended. In any event, the passage of ozone through the reaction mixture is continued until ozone appears in substantial proportions in the exit gases, thus indicating that the acrolein dimer has been substantially completely reacted. The introduction of ozone is then discontinued.

The product of the ozonization reaction is presumably an "ozonide," and will be referred to herein as such. I have not isolated or characterized this material, however, and I am not certain as to its identity or structure. Whatever its nature, it is readily converted into pyrrolidonecarboxylic acid and into glutamic acid by the procedure described hereinafter.

The ozonization product mixture is subjected to treatment to cleave and to selectively oxidize the ozonide. The cleavage is desirably carried out with a hydrolytic agent, e.g. water or an acid such as acetic acid, formic acid, sulfuric acid, hydrochloric acid, or the like, at ordinary or elevated temperatures, e.g. from about 20 to about 100° C. The oxidation can be carried out at the same time or subsequently, employing a selective oxidizing agent to effect non-destructive oxidation, at elevated temperatures up to the reflux point, suitably from about 50 to about 150° C. In a preferred technique, the ozonization product is added to water, then treated with air or oxygen until the solution becomes free from active oxygen (i.e., fails to liberate iodine from potassium iodide). For this purpose, a mixture of oxygen with a catalytic amount of ozone (around 0.01 to 0.1%) is especially desirable. In another technique, the ozonization product is acidified (unless already acidic) with sulfuric acid, hydrochloric acid, formic acid, acetic acid, or the like, then admixed with water and hydrogen peroxide, and refluxed for about ½ to about 5 hours. The relative quantities of water, hydrogen peroxide, and ozonide solution can be varied widely. Other oxidizing agents can also be employed, such as cupric oxide, hypochlorous acid, sodium hypochlorite, potassium permangante, oxides of nitrogen, and the like.

The oxidized ozonization product is readily converted into ammonium pyrrolidonecarboxylate by reaction with ammonia at elevated temperatures. Prior to ammonia treatment, any volatile organic acids, such as formic acid or acetic acid, are removed by fractional distillation, azeotropic distillation, or by other suitable means. Inorganic acids, such as sulfuric acid, are neutralized and/or removed, e.g., by precipitation with barium hydroxide or other suitable base. Any solids resulting therefrom are filtered off. The ammoniation can be carried out with either aqueous or anhydrous ammonia. The quantity of ammonia can be varied widely, but should preferably be at least sufficient to react fully with all of the intermediates capable of being converted into glutamic acid. For this purpose it is sufficient to use ammonia in a 2:1 molar ratio to the original acrolein dimer, but I prefer to use a ratio between about 2:1 and about 6:1. The ammoniation is suitably carried out in a pressure vessel at a temperature between about 250 and about 350° C. for about ½ to about 30 hours, the time and temperature varying inversely.

The product of the ammoniation reaction is believed to be predominantly an ammonium salt of pyrrolidonecarboxylic acid, from which pyrrolidonecarboxylic acid can readily be recovered in a known manner. The crude ammoniation product can also be treated to produce DL-glutamic acid by hydrolysis under acid or basic conditions well known to the art. After hydrolysis, the DL-glutamic acid can be recovered from the hydrolysate by crystallization at its iso-electric point.

The following operating examples will more clearly illustrate my invention.

*Example 1*

Into a solution of 5.6 grams (0.05 mole) of acrolein dimer in 100 ml. of glacial acetic acid was bubbled a stream of oxygen containing 4% ozone at the rate of 30 liters per hour for 1.5 hours at 10 to 12° C. The mixture was then heated to reflux (90–100° C.) and treated at reflux with a stream of oxygen containing 0.05% ozone. After a total treating time of about 7.5 hours, the mixture was free from active oxygen, as shown by a test with potassium iodide. The completed mixture was evaporated to dryness at reduced pressure. The residue was commingled with 80 ml. of concentrated (28%) ammonium hydroxide solution, heated in a Parr bomb at 250° C. for 3 hours, evaporated to dryness, and refluxed 4 hours with 100 ml. of aqueous 20% hydrochloric acid. The resulting hydrolyzate contained 2.46 grams of DL-glutamic acid, equivalent to a yield of 33.5% of theoretical, based upon the original acrolein dimer.

*Example 2*

Into a solution of 5.6 grams (0.05 mole) of acrolein dimer in 50 ml. of methylene chloride was bubbled a stream of oxygen containing 4% ozone at the rate of 30 liters per hour for 1.75 hours, the temperature being maintained at about −50 to −70° C. The treated material was purged with oxygen for 20 minutes. A solution of 3.4 grams (0.05 mole) of 50% hydrogen peroxide in 20 ml. of glacial acetic acid was then added. The mixture was heated to 75° C. and treated for 2.5 hours at this temperature with a stream of oxygen containing 0.05% ozone. A test with potassium iodide showed the presence of active oxygen—i.e., unconverted ozonide. The treatment was then resumed at reflux temperature (90° C.); and after 11 additional hours, the test for active oxygen was negative. The product was evaporated, ammoniated, and hydrolyzed as in Example 1, yielding 1.9 grams of DL-glutamic acid, corresponding to a yield of 25.9% of theoretical.

*Example 3*

A mixture of 5.6 grams (0.05 mole) of acrolein dimer and 50 ml. of methylene chloride was treated at −50 to −70° C. with 4% ozone in oxygen at 30 liters per hour for 2 hours, and a product was obtained comprising a white, rubbery solid intermingled with the solvent. The product was diluted with 50 ml. of methanol and allowed to warm to room temperature. The solid did not dissolve. An additional 50 ml. portion of methanol was added and the mixture was refluxed at 50 to 60° C. while being treated with a stream of oxygen. The resulting solution was mixed with 100 ml. of distilled water, and the alcohol was removed by distillation under reduced pressure. The aqueous solution obtained thereby was made basic (pH about 8) with sodium hydroxide, and 5.66 grams (0.05 mole) of 30% hydrogen peroxide were added with stirring. No rise in temperature was observed. The mixture was then refluxed for 2.5 hours, after which it was found to be free from active oxygen. It was then evaporated to dryness, ammoniated, and hydrolyzed as in Example 1. The product contained 1.08 grams of DL-glutamic acid, corresponding to a yield of 14.7% of theoretical.

While the conversion of acrolein dimer into glutamic acid and into glutamic acid precursor compounds is conveniently carried out under the conditions and according to the procedures outlined above in the description and the operating examples, it is to be understood that such matters are illustrative only and not by way of limitation. Numerous modifications and equivalents of the invention will be apparent from the foregoing description to those skilled in the art.

In accordance with the foregoing description, I claim as my invention:

1. A process for preparing a substance convertible, by ammoniation, into an ammonium salt of pyrrolidonecarboxylic acid, which comprises subjecting acrolein dimer to ozonization, and cleaving and oxidizing the resulting ozonization product.

2. A process which comprises subjecting acrolein dimer to ozonization, cleaving the resulting ozonization product under oxidizing conditions, and ammoniating the oxidation product, whereby an ammonium salt of pyrrolidonecarboxylic acid is obtained.

3. A process for preparing pyrrolidonecarboxylic acid which comprises subjecting acrolein dimer to ozonization, cleaving the ozonization product under oxidizing conditions, ammoniating the oxidation product, whereby an ammonium salt of pyrrolidonecarboxylic acid is obtained, and recovering pyrrolidonecarboxylic acid therefrom.

4. A process which comprises treating a solution of acrolein dimer in an organic solvent with an ozone-containing gas until the absorption of ozone substantially ceases, cleaving the resulting ozonization product with an oxidizing agent at a temperature between about 50 and about 150° C., and reacting the oxidized material with ammonia at a temperature between about 250 and about 350° C. for a period of about ½ to about 30 hours, whereby an ammonium salt of pyrrolidonecarboxylic acid is obtained.

5. The process of claim 4 in which said organic solvent is a volatile halogenated hydrocarbon.

6. A process which comprises treating a solution of acrolein dimer in a volatile halogenated hydrocarbon with an ozone-containing gas at a temperature between about 15 and about 40° C. until the absorption of ozone substantially ceases, decomposing the resulting ozonide with air containing a catalytic proportion of ozone at a temperature between about 50 and about 150° C., and reacting the oxidized material with ammonia at a temperature between about 250 and about 350° C. for a period of about ½ to about 30 hours, whereby an ammonium salt of pyrrolidonecarboxylic acid is obtained.

7. The process of claim 6 in which said volatile halogenated hydrocarbon is methylene chloride.

8. A process which comprises treating a solution of acrolein dimer in a volatile halogenated hydrocarbon with an ozone-containing gas at a temperature between about 15 and about 40° C. until the absorption of ozone substantially ceases, decomposing the resulting ozonide by refluxing with hydrogen peroxide, and reacting the oxidized material with ammonia at a temperature between about 250 and about 350° C. for a period of about ½ to about 30 hours, whereby an ammonium salt of pyrrolidonecarboxylic acid is obtained.

9. In a process for preparing glutamic acid wherein a pyrrolidonecarboxylic acid precursor compound is ammoniated to produce an ammonium salt of pyrrolidonecarboxylic acid, the said salt is hydrolyzed to produce glutamic acid, and the glutamic acid is recovered, the improvement which comprises subjecting acrolein dimer to ozonization and cleaving the resulting ozonization product under oxidizing conditions to produce said pyrrolidonecarboxylic acid precursor compound.

References Cited in the file of this patent

UNITED STATES PATENTS 2,833,786    Purvis _____ May 6, 1958

OTHER REFERENCES

Sherlin et al.: C.A., vol. 32, July-September 1938, p. 5398³.